(12) United States Patent
Banvait et al.

(10) Patent No.: US 10,207,560 B2
(45) Date of Patent: Feb. 19, 2019

(54) ROADWAY-CROSSING-ANOMALY DETECTION SYSTEM AND METHOD

(71) Applicant: Ford Global Technologies, LLC., Dearborn, MI (US)

(72) Inventors: Harpreetsingh Banvait, Sunnyvale, CA (US); Scott Vincent Myers, Camarillo, CA (US); Ashley Elizabeth Micks, Mountain View, CA (US); Sneha Kadetotad, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/845,764

(22) Filed: Dec. 18, 2017

(65) Prior Publication Data

US 2018/0105009 A1 Apr. 19, 2018

Related U.S. Application Data

(63) Continuation of application No. 15/014,971, filed on Feb. 3, 2016, now Pat. No. 9,889,716.

(51) Int. Cl.
*B60G 17/0165* (2006.01)
*B60G 17/018* (2006.01)
(Continued)

(52) U.S. Cl.
CPC ....... *B60G 17/0165* (2013.01); *B60G 17/019* (2013.01); *B60G 17/0162* (2013.01); *B60G 17/0182* (2013.01); *B60G 17/0195* (2013.01); *B60W 10/20* (2013.01); *B60W 10/22* (2013.01); *B60W 30/025* (2013.01); *B60W 40/10* (2013.01); *B60G 2400/05* (2013.01); *B60G 2400/30* (2013.01); *B60G 2400/823* (2013.01); *B60G 2400/842* (2013.01); *B60G 2401/14* (2013.01); *B60G 2401/174* (2013.01);
(Continued)

(58) Field of Classification Search
None
See application file for complete search history.

(56) References Cited

U.S. PATENT DOCUMENTS 7,769,544 B2 8/2010 Blesener
8,473,154 B2 * 6/2013 Noumura ............ B60W 10/04
180/167

(Continued)

FOREIGN PATENT DOCUMENTS

CA 2412134 C 2/2015

*Primary Examiner* — Todd M Melton
(74) *Attorney, Agent, or Firm* — David R. Stevens; Stevens Law Group (57) ABSTRACT

A method for improving the safety and comfort of a vehicle driving over a railroad track, cattle guard, or the like. The method may include receiving, by a computer system, one or more inputs corresponding to one or more forward looking sensors. The computer system may also receive data characterizing a motion of the vehicle. The computer system may estimate, based on the one or more inputs and the data, a motion of a vehicle with respect to a railroad track, cattle guard, or the like extending across a road ahead of the vehicle. Accordingly, the computer system may change a suspension setting, steering setting, or the like of the vehicle to more safely or comfortably drive over the railroad track, cattle guard, or the like.

20 Claims, 6 Drawing Sheets

(51) Int. Cl.

| | | |
|---|---|---|
| *B60G 17/019* | (2006.01) | |
| *B60G 17/016* | (2006.01) | |
| *B60W 10/22* | (2006.01) | |
| *B60W 40/10* | (2012.01) | |
| *B60W 30/02* | (2012.01) | |
| *B60W 10/20* | (2006.01) | |
| *B60G 17/0195* | (2006.01) | |
| *H04L 12/40* | (2006.01) | |
| *H04L 29/08* | (2006.01) | |

(52) U.S. Cl.
CPC .... *B60G 2401/176* (2013.01); *B60G 2401/21* (2013.01); *B60W 2400/00* (2013.01); *B60W 2420/42* (2013.01); *B60W 2420/52* (2013.01); *B60W 2420/54* (2013.01); *B60W 2420/62* (2013.01); *B60W 2720/14* (2013.01); *B60W 2720/16* (2013.01); *B60W 2720/18* (2013.01); *H04L 12/40* (2013.01); *H04L 67/12* (2013.01); *H04L 2012/40215* (2013.01); *H04L 2012/40273* (2013.01)

(56) References Cited

U.S. PATENT DOCUMENTS

| | | | |
|---|---|---|---|
| 8,787,619 | B2 | 7/2014 | Del Grande |
| 8,965,685 | B1* | 2/2015 | Denaro .............. G01C 21/3697 |
| | | | 701/423 |
| 9,533,539 | B2* | 1/2017 | Eng ...................... B60G 17/019 |
| 2009/0315993 | A1 | 12/2009 | Hirai |
| 2012/0242835 | A1 | 9/2012 | Li |
| 2012/0268602 | A1 | 10/2012 | Hirai |
| 2014/0022109 | A1 | 1/2014 | Lee |
| 2015/0166072 | A1 | 6/2015 | Powers |
| 2016/0139262 | A1* | 5/2016 | Staynov .............. B60K 31/0008 |
| | | | 342/52 |

\* cited by examiner

ROADWAY-CROSSING-ANOMALY DETECTION SYSTEM AND METHOD

RELATED APPLICATION

This application is a continuation of U.S. application Ser. No. 15/014,971 filed Feb. 3, 2016 and entitled "Roadway-Crossing-Anomaly Detection System and Method", which is hereby incorporated herein by reference in its entirety.

BACKGROUND

Field of the Invention

This invention relates to vehicular systems and more particularly to systems and methods for perceiving certain anomalies in a road surface and responding appropriately.

Background of the Invention

To provide, enable, or support functionality such as driver assistance, controlling vehicle dynamics, and/or autonomous driving, a vehicle needs to accurately perceive the environment through which it is driving. Unfortunately, some anomalies found in a driving environment may create unique challenges, depending on various factors. Accordingly, what is needed is a system and method for improving how such anomalies are recognized and how a vehicle prepares to encounter them.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
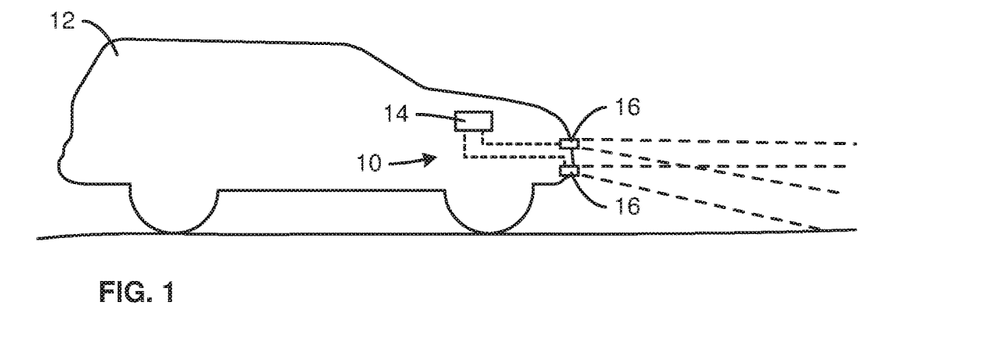
FIG. 1 is a schematic diagram illustrating a vehicle comprising a system in accordance with the present invention.

Referring to FIG. 1, a system 10 in accordance with the present invention may enable a vehicle 12 to better prepare for certain types of anomalies in a driving environment. A system 10 may do this in any suitable method. For example, a system 10 may be embodied as hardware, software, or some combination thereof.

In certain embodiments, a system 10 may include a computer 14 and one or more sensors 16. The computer 14 and sensors 16 may be carried on-board a vehicle 12. Accordingly, those components 14, 16 may each be characterized as "on-board" components. In operation, one or more sensors 16 may output signals and a computer 14 may use data corresponding to or derived from those signals to perceive certain road-surface anomalies and prepare the vehicle 12 to encounter those anomalies.

In selected embodiments, certain on-board sensors 16 may be forward looking. Forward looking sensors 16 may monitor a road surface ahead of a vehicle 12. Such forward looking sensors 18a may be used for driver assistance, controlling vehicle dynamics, and/or autonomous driving. For example, data derived from or corresponding to such sensors 16 may be used to identify certain anomalies and their position relative to a corresponding vehicle 12. Once such anomalies are identified, a system 10 may enable a vehicle 12 to prepare to successfully navigate them.

Figure 2:
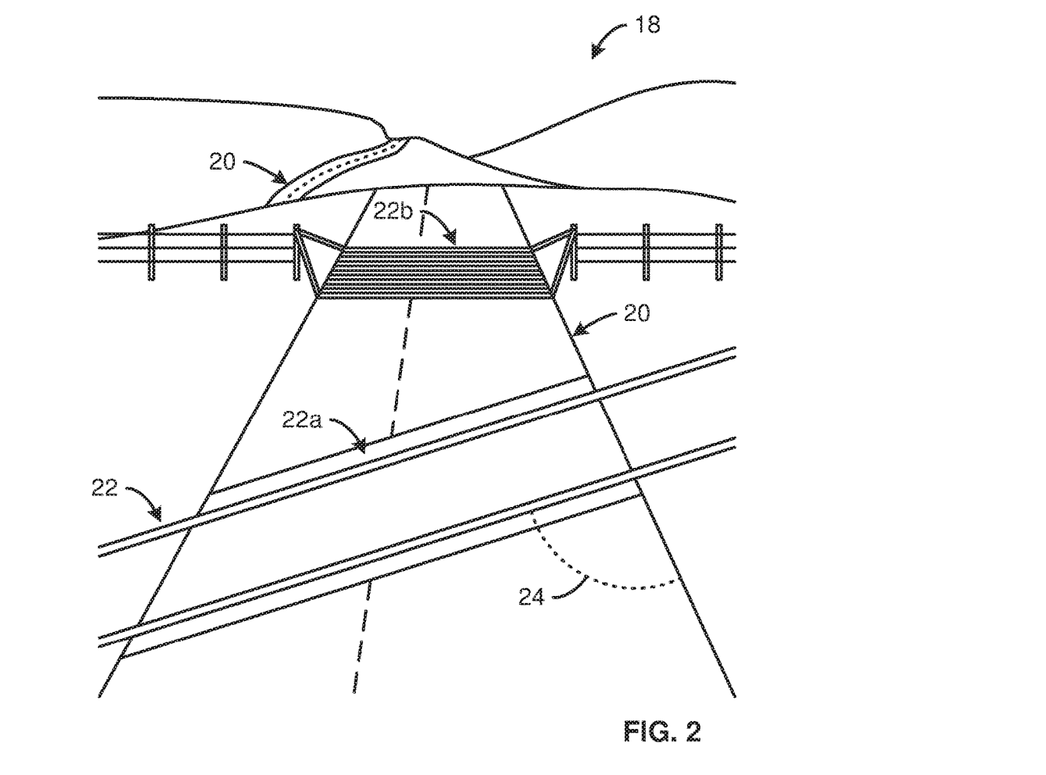
FIG. 2 is a schematic diagram illustrating a driving environment comprising anomalies.

Referring to FIG. 2, in selected embodiments, a real-world driving environment 18 may comprise a driving surface 20 (e.g., road 20) and various anomalies 22 distributed across the driving surface 20. The anomalies 22 in a driving environment 18 may be features or objects that intermittently or irregularly affect the operation of vehicles 12 in the real world. Certain such anomalies 22 such a railroad tracks 22a and cattle guards 22b may create unique challenges, depending on various factors such as vehicular speed, curvature of the road 20, temperature, precipitation, or the like.

Railroad tracks 22a are found in various geographical regions and intersect roads 20 at many locations. Railroad tracks 22a are made of metal, while the roads 20 they cross are typically not made of metal. This difference in material introduces sudden change in frictional coefficients when a vehicle 12 drives from a road surface over a railroad track 22a and back to the road surface. Under rain or snow conditions, such a crossing may cause a vehicle 12 to become unstable and deviate from its desired trajectory. These undesirable effects may be magnified when a railroad track 22a crosses a road 20 at an angle 24 other than ninety degrees, crosses a road 20 at a bend or curve in that road 20, or a combination thereof.

Cattle guards 22b may cause similar problems. In grazing or range areas, a cattle guard 22b may be used in the place of a gate. A vehicle 12 may drive over a cattle guard 22b, but cattle will not typically walk over one. Accordingly, the cattle guard 22b may function as a gate (i.e., block the passage of cattle), without requiring any opening or closing in order to permit a vehicle 12 to pass.

Cattle guards 22b may be actual or virtual. An actual cattle guard 22b may include multiple rails that extend parallel to one another and, typically, orthogonal to the surrounding road 20. The rails may be spaced apart a distance that is significant with respect to (e.g., about equal in width to) the hooves of cattle, but insignificant (e.g., at least passable) to the wheels of a vehicle 12. The rails may be narrow enough that cattle cannot confidently step thereon to cross the cattle guard 22b. Moreover, below the spaced rails may be open space. Accordingly, cattle may recognize the uncertain footing provided by a cattle guard 22b and not make an attempt to cross it.

The rails of an actual cattle guard 22b are often made of metal, a material dissimilar from the surface of the surrounding road 20. This difference in material may introduce abrupt changes in frictional coefficients as a vehicle 12 drives over a cattle guard 22b and back to a road surface. Under rain or snow conditions these abrupt changes may cause a vehicle 12 to become unstable and deviate from its desired trajectory. These undesirable effects may be magnified by certain oscillations the rails of a cattle guard 22b induce in the suspension of the vehicle 12.

A virtual cattle guard 22b may remind cattle of one or more actual cattle guards 22b they have previously encountered and, therefore, produce the same barrier or blocking effect. However, a virtual cattle guard 22b may not provide the same uncertain footing that is provided by an actual cattle guard 22b. For example, a virtual cattle guard 22b may include multiple lines that are painted or adhered onto a road 20 to extend parallel to one another and, typically, orthogonal to the surrounding road 20. The lines may be spaced apart a distance that resembles that of an actual cattle guard 22b. Accordingly, cattle conditioned to actual cattle guards 22b may not see sufficient difference in a virtual cattle guard 22b to ever test it.

A virtual cattle guard 22b may have certain advantages over an actual cattle guard 22b. A virtual cattle guard 22b may be much less expensive to install. Additionally, a virtual cattle guard 22b may be much less disruptive to the vehicles 12 passing thereover. Specifically, a virtual cattle guard 22b may not cause the traction issues and suspension oscillations corresponding to an actual cattle guard 22b.

In selected embodiments, a system 10 may lower the adverse effects associated with crossing railroad tracks 22a, cattle guards 22b, and the like. For example, forward looking sensors 16 may monitor a road surface ahead of a vehicle 12. Accordingly, the data from such sensors 16 may be used to perceive railroad tracks 22a and cattle guards 22b, distinguish between virtual cattle guards 22b and actual cattle guards 22b, implement appropriate responses or preparations when such anomalies 22 are perceived, or the like or combinations or sub-combinations thereof.

Figure 3:
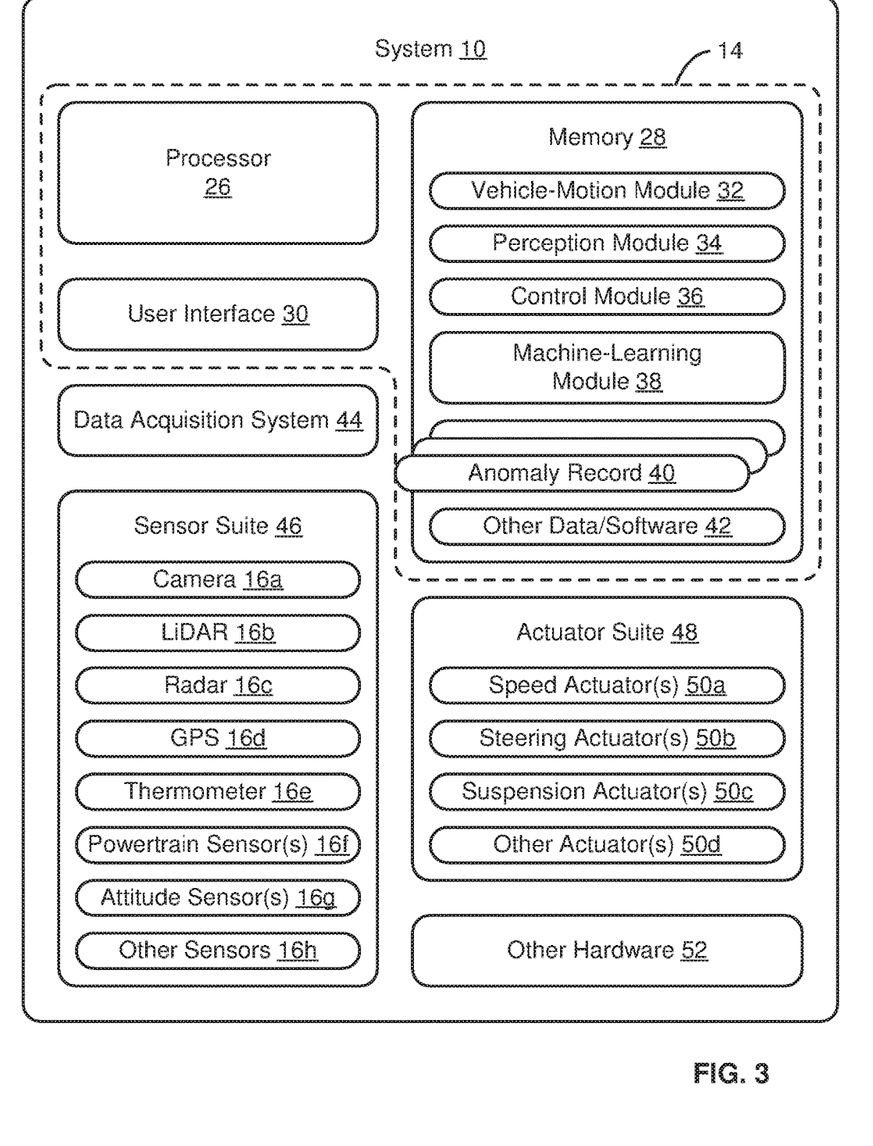
FIG. 3 is a schematic block diagram of one embodiment of a system in accordance with the present invention.

Referring to FIG. 3, in selected embodiments, a system 10 in accordance with the present invention may be self contained and operate independent of any other computer system or hardware that is not carried on-board the corresponding vehicle 12. Alternatively, a system 10 may communicate as necessary with at least one remote computer via a communication network (e.g., a cellular network, satellite network, local area wireless network, or the like). This may allow perception or control algorithms, machine learning, knowledge of the location and effects of one or more anomalies 22, or the like that correspond to (e.g., were developed on) one vehicle 12 to be passed to and used by another vehicle 12. In still other embodiments, certain components or functional elements of a system 10 may be located somewhere other than on-board a corresponding vehicle 12. Accordingly, the functionality associated with a system 10 may be performed on-board a vehicle 12, off-board a vehicle 12, or some combination thereof.

In selected embodiments, a computer 14 portion of a system 10 in accordance with the present invention may comprise computer hardware and computer software. The computer hardware of a computer 14 may include one or more processors 26, memory 28, a user interface 30, other hardware, or the like or a combination or sub-combination thereof. The memory 28 may be operably connected to the one or more processors 26 and store the computer software. This may enable the one or more processors 26 to execute the computer software.

A user interface 30 of a computer 14 may enable an engineer, technician, or a driver to interact with, customize, or control various aspects of a computer 14. In selected embodiments, a user interface 30 of a computer 14 may include one or more buttons, keys, touch screens, pointing devices, or the like or a combination or sub-combination thereof. In other embodiments, a user interface 30 of a computer system 14 may simply comprise one or more connection ports, pairings, or the like that enable an external computer to interact or communicate with the computer 14.

In selected embodiments, the memory 28 of a computer 14 may store software programmed to use data corresponding to one or more sensors 16 to perceive and prepare for one or more anomalies 22 in a driving environment 18. Such software may have any suitable configuration. In certain embodiments, the software of a computer 14 may include a vehicle-motion module 32, perception module 34, control module 36, machine-learning module 38, or the like or a combination or sub-combination thereof. Alternatively, or in addition thereto, memory 28 may store one or more anomaly records 40, other data or software 42, or the like or a combination or sub-combination thereof A vehicle-motion module 32 may use data corresponding to one or more sensors 16 to determine how a corresponding vehicle 12 is moving. In selected embodiments, this may be accomplished by combining sensor data (e.g., data corresponding to or derived from one or more sensors 16) characterizing driver controlled parameters such as velocity, drive torque, brake actuation, steering input, or the like with data indicative of a current attitude or orientation of a body of the vehicle 12 to obtain motion information articulating the current motion state of the body of the vehicle 12.

In selected embodiments, a vehicle-motion module 32 may use sensor data characterizing driver controlled parameters to obtain or define a vector setting forth a direction of travel and velocity at a particular moment in time. Sensor data indicative of a current attitude or orientation of a body of the vehicle 12 may corresponding to one or more inertial measurement units, gyroscopes, accelerometers, or the like or combinations or sub-combinations thereof. A vehicle-motion module 32 may use such sensor data to define one or more parameters such as pitch, roll, and yaw of a body of the vehicle 12. Accordingly, by using various types of sensor data, a vehicle-motion module 32 may output motion information that substantially completely estimates and articulates the motion of the body of vehicle 12 at a given moment in time. In selected embodiments, a vehicle-motion module 32 may collect such motion or attitude data or a portion thereof from a controller area network (CAN) bus of a vehicle 12.

A perception module 34 may analyze data corresponding to one or more sensors 16 in an effort to perceive one or more anomalies 22 within the path of the corresponding vehicle 12. For example, a perception module 34 may analyze data corresponding to one or more forward-looking sensors 16 to perceive one or more anomalies 22 ahead of a vehicle 12. Alternatively, or in addition thereto, a perception module 34 may analyze data corresponding to one or more sensors 16 that characterize how a vehicle 12 experiences (e.g., reacts when driving over) one or more anomalies 22. In certain embodiments, a perception module 34 may collect selected data characterizing how a vehicle 12 experiences one or more anomalies 22 from a controller area network (CAN) bus of a vehicle 12.

In selected embodiments, a perception module 34 may determine, quantify, estimate, or the like the type of anomaly 22, distance from the vehicle 12 to the anomaly 22, time before the vehicle 12 encounters the anomaly 22, angle 24 of the anomaly 22 with respect to the road 20, curvature of the road 20 when the anomaly 22 is encountered, or the like or combinations or sub-combinations thereof.

A control module 36 may control how a vehicle 12 responds to (e.g., prepares to encounter) one or more anomalies 22 identified or perceived by a perception module 34. The responses issued by a control module 36 may vary from simply warning a human driver of an approaching anomaly 22 to controlling a function that has traditionally been left to a human driver (e.g., controlling speed of a vehicle 12 by letting off on the throttle or braking, controlling the steering of a vehicle 12, or the like). Accordingly, depending on the nature of the anomaly 22, the time until the vehicle 12 reaches the anomaly 22, and the configuration of the system 10, a control module 36 may provide information to a human driver (e.g., flash a warning light, vibrate a seat, or sound an alarm), assist a human driver (e.g., change a suspension configuration or terminate cruise control), act in the place of a human driver (e.g., actively brake or steer a vehicle 12), or the like or a combination or sub-combination thereof.

A machine-learning module 38 may support the operation or expand the functionality of a vehicle-motion module 32, perception module 34, control module 36, or the like or combinations or sub-combinations thereof. For example, a machine-learning module 38 may develop, improve, or implement one or more algorithms corresponding to a perception module 34 that differentiate between and/or identify various anomalies 22. Similarly, a machine-learning module 38 may develop, improve, or implement one or more algorithms corresponding to a control module 36 that identify appropriate responses for various anomalies 22. In selected embodiments, a machine-learning module 38 may be structured as a deep neural network.

An anomaly record 40 may comprise data characterizing a particular anomaly 22 located on a particular road 20. The data may reflect how the particular anomaly 22 was perceived from one or more forward looking sensors 16, how driving over the particular anomaly 22 affected the vehicle 12, or the like or a combination thereof. One or more anomaly records 40 may be used as training data or the like by a machine-learning module 38. Alternatively, or in addition thereto, one or more anomaly records 40 may be used to prepare for the particular anomaly 22 should the vehicle 12 (or some other vehicle 12 connected via a computer network) drive over that particular road 20 again.

In selected embodiments, a system 10 may include various components in addition to a computer 14. For example, a system 10 may include a data acquisition system 44, a sensor suite 46 comprising one or more sensors 16, an actuator suite 48 comprising one or more actuators 50, other hardware 52 as desired or necessary, or the like or a combination or sub-combination thereof.

In certain embodiments, a data acquisition system 44 may sample signals output by one or more sensors 16 and convert the resulting samples into inputs (e.g., digital numeric values) that can be manipulated by a computer 14. For example, a data acquisition system 44 may convert signals in the form of analog waveforms into inputs in the form of digital values suitable for processing. In certain embodiments, a data acquisition system 44 may include conditioning circuitry that converts signals output by one or more sensor 16 into forms that can be converted to digital values, as well as analog-to-digital converters to perform such converting.

A sensor suite 46 may comprise the one or more sensors 16 carried on-board a vehicle 12. Certain such sensors 16 may each comprise a transducer that senses or detects some characteristic of an environment and provides a corresponding output (e.g., an electrical or optical signal) that defines that characteristic. For example, one or more sensors 16 of a sensor suite 46 may be accelerometers that output an electrical signal characteristic of the proper acceleration being experienced thereby. Such accelerometers may be used to determine the orientation, acceleration, velocity, and/or distance traveled by a vehicle 12. In certain embodiments, a sensor suite 46 of a system 10 may include one or more cameras 16*a*, laser scanners (e.g., LiDAR scanners 16*b*), radar devices 16*c*, global positioning systems 16*d*, temperature sensors 16*e*, powertrain sensors 16*f*, attitude sensors 16*g*, other sensors 16*h* (e.g., ultrasonic transducers), or the like or combinations or sub-combinations thereof.

In selected embodiments, one or more cameras 16*a*, LiDAR scanners 16*b*, radar devices 16*c*, or the like or combination or sub-combinations thereof may be forward looking sensors 16 useful in characterizing or perceiving one or more anomalies 22 located ahead in the path of the vehicle 12. A global positioning system 16*d* may provide location and/or speed data to a computer 14. In selected embodiments, location data derived from a global positioning system 16*d* may incorporated into an anomaly record 40. Accordingly, as a current location of a vehicle 12 approaches a known location of an anomaly 22, a control module 36 may prepare a vehicle 12 to encounter than anomaly 22.

A thermometer 16*e* may characterize an ambient temperature surrounding a vehicle 12. Accordingly, ambient temperature may be factored into how best to respond to a particular anomaly 22. For example, colder temperatures may be associated with ice, snow, and/or other causes of lower traction or frictional engagement between the tires of a vehicle 12 and a driving surface 20. Accordingly, if the ambient temperature is near, at, or below freezing, a control module 36 may implement a more conservative approach or response to an anomaly 22 than if the ambient temperature is well above freezing.

Powertrain sensors 16*f* may include one or more devices characterizing the speed of a vehicle, engine torque, wheel slippage, or the like. Accordingly, the speed of a vehicle, engine torque, wheel slippage, or the like may be factored into how best to respond to a particular anomaly 22. For example, if, during a particular drive, wheel slippage occurs while the engine torque is relatively low, it may be an indicator of poor traction or frictional engagement between the tires of a vehicle 12 and a driving surface. Accordingly, during that drive, a control module 36 may implement a more conservative approach or response to one or more anomalies 22. In selected embodiments, powertrain sensors 16*f* may include one or more revolution counters or sensors, strain gauges, or the like or combinations thereof.

Attitude sensors 16*g* may include one or more devices characterizing the orientation of a vehicle 12 or some component thereof with respect to a universal coordinate system, vehicular coordinate system, road surface, or the like or combinations thereof. Accordingly, orientation of a vehicle 12 may be factored into how best to respond to a particular anomaly 22. For example, if one or more attitude sensors 16f indicate that vehicle 12 is turning (e.g., experiencing a lateral acceleration, has front wheels pointing somewhere other than straight ahead), it may be an indicator that certain lateral forces or considerations may need to be taken into account when deciding how best to prepare for an anomaly 22. In selected embodiments, attitude sensors 16g may include one or more gyroscopes, inertial measurement units, rotation sensors, strain gauges, or the like or a combination or sub-combination thereof.

An actuator suite 48 may comprise the one or more actuators 50 carried on-board a vehicle 12. Such actuators 50 may operate under the direction of a control module 36. Accordingly, the actuators 50 may implement or effect the responses to anomalies 22 dictated by the control module 36. For example, one or more actuators 50 of an actuator suite 48 may, under the direction of a control module 36, provide information to a human driver (e.g., flash a warning light, vibrate a seat, or sound an alarm), assist a human driver (e.g., change a suspension configuration or terminate cruise control), act in the place of a human driver (e.g., actively brake or steer a vehicle 12), or the like or a combination or sub-combination thereof.

Certain actuators 50 within an actuator suite 48 may each comprise a switch or controller that, when activated or instructed, turns something on or off. Certain other such actuators 50 within an actuator suite 48 may each comprise a transducer that receives an input signal (e.g., an electrical signal or current) and produces a particular motion in response thereto. For example, one or more actuators 50 of an actuator suite 48 may be or comprise solenoids that convert electrical energy into motion (e.g., linear motion).

In certain embodiments, an actuator suite 48 of a system 10 may include one or more speed actuators 50a, steering actuators 50b, suspension actuators 50c, other actuators 50d, or the like or a combination or sub-combination thereof. A speed actuator 50a may control the speed of a vehicle 12 by letting off the throttle, turning off cruise control, applying the brakes, or the like. A steering actuator 50b may steer a vehicle 12. A suspension actuator 50c may control or adjust some aspect of a suspension system of a vehicle 12.

For example, in selected embodiments, a suspension actuator 50c may adjust or control in some manner the vertical movement of one or more wheels relative to the chassis or body of a vehicle 12. This may include firming or softening a suspension, increasing or decreasing a ride height, increasing or decreasing the frequency of oscillation of a suspension system, or the like or combinations or sub-combinations thereof.

In certain embodiments, one or more other actuators 50d included within a actuator suite 48 may include or comprise communication actuators. Communication actuators may not affect the handling, driving, or performance of a vehicle 12. Rather, they may provide, initiate, or terminate certain communications or messages directed to a driver of a vehicle 12. For example, one or more communication actuators may, under the direction of a control module 36, start or stop a warning light or text-based message, vibration of a seat or steering wheel, an audible alarm or spoken message, or the like or a combination or sub-combination thereof.

Figure 4:
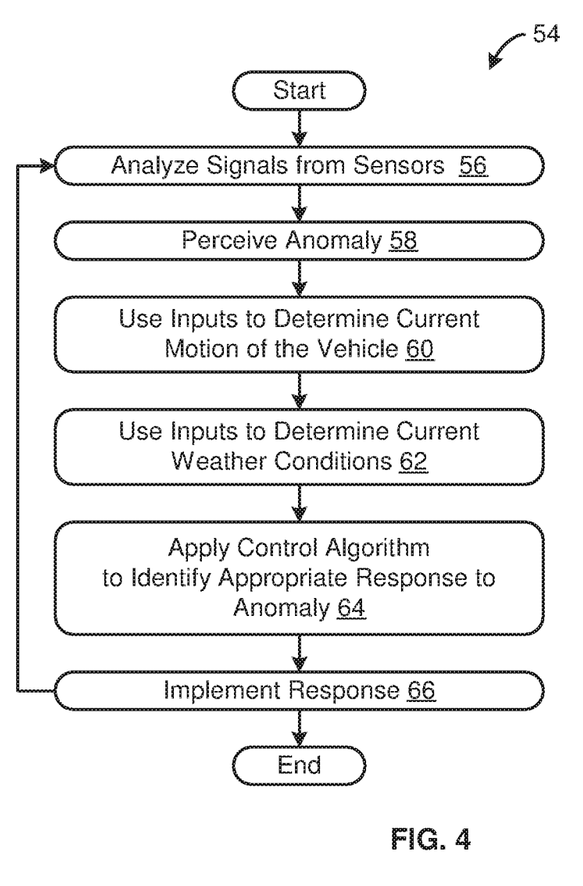
FIG. 4 is a schematic block diagram of an embodiment of a first method that may be executed by a system in accordance with the present invention.

Referring to FIG. 4, a system 10 may support, enable, or execute a process 54 in accordance with the present invention. In selected embodiments, such a process 54 may begin with analyzing 56 data or signals corresponding to one or more sensors 16. Based on that analyzing 56, an anomaly 22 such as a railroad track 22a, cattle guard 22b, or the like may be perceived 58. Perceiving 58 the anomaly 22 may include identifying the anomaly 22 (e.g., differentiating between railroad track 22a, actual cattle guard 22b, virtual cattle guard 22b, or the like), estimating a distance from the vehicle 12 to the anomaly 22, determining an orientation or angle 24 of the anomaly 22 with respect to the road 20, determining curvature of the road 20 in the area surrounding the anomaly 22, or the like or a combination or sub-combination thereof.

One or more inputs (e.g., data from one or more sensors 16) may be used 60 to determine current motion of a vehicle 12. This information may be used to determine how best to prepare to encounter an anomaly 22. For example, if the speed of a vehicle 12 and the distance to the anomaly 22 are known or determined, then a system 10 may calculate when the vehicle 12 will encounter the anomaly 22. In selected embodiments, one or more inputs may be used 60 to determine speed of a vehicle, orientation of the vehicle 12 with respect to a road 20, orientation of the vehicle 12 with respect to the anomaly 22, current steering direction, current suspension settings or configuration, or the like or a combination or sub-combination thereof.

One or more inputs (e.g., data from one or more sensors 16) may be used 62 to determine current weather conditions in an area surrounding a vehicle 12. This information may be also used to determine how best to prepare to encounter an anomaly 22. For example, if one or more inputs indicate that it is at or below freezing, there is water, ice, or snow on the road 20, or some combination thereof, then the appropriate responses to an anomaly 22 may take those factors into consideration. In selected embodiments, one or more inputs may be used 62 to determine ambient temperature, presence or absence of precipitation, presence or absence of water, ice, or snow on a road 20, or the like or a combination or sub-combination thereof.

Once sufficient data regarding an anomaly 22, the current motion of the vehicle 12, and/or the ambient weather conditions has been gathered, a system 10 may apply 64 a control algorithm to that data to identify an appropriate response (e.g., an appropriate collection of one or more actions) to the anomaly 22. Depending on various factors, the appropriate response may include: initiating a warning light or text-based message, vibration of a seat or steering wheel, an audible alarm or spoken message, changing a suspension configuration; terminating cruise control; letting off the throttle; actively braking; steering a vehicle 12 to encounter an anomaly 22 like a railroad track 22a at an angle 24 as close to ninety degrees as possible given the dimensions of the lane and/or road; or the like or a combination or sub-combination thereof. A system 10 may then implement 66 the appropriate response.

For example, in selected embodiments, anomalies such as railroad tracks 22a, actual cattle guards 22b, or the like may be detected by acquiring signal from several sensors and processing them with an algorithm. The sensors 16 may include one or more cameras, radar devices, ultrasound devices, LiDAR scanner (e.g., solid state LiDAR), and devices posting data on a controller area network (CAN) bus of a vehicle 12. The outputs of one or more such sensors 16 may be taken as an input to a fusion algorithm. The output of this algorithm may include a three dimensional location (e.g., X, Y, and Z) of a railroad track 22a or actual cattle guard 22b with respect to a body coordinate system of the vehicle 12.

The algorithm may take input from one or more such sensors to estimate the location of the railroad tracks 22a or actual cattle guard 22b with reference to the body coordinate system. Additionally, by using information (e.g., pitch, vehicle speed, and height) from the CAN bus, an algorithm may determine a position of the front wheels of the vehicle 12 with respect to the railroad tracks 22a or actual cattle guard 22b. The outputs of this algorithm, like X, Y and Z location of railroad tracks 22a or actual cattle guard 22b, may help the vehicle 12 to be better prepared to pass over the railroad tracks 22a or actual cattle guard 22b without losing control of the vehicle 12. Additionally, it may be used to control an active suspension of the vehicle 12 to make the drive over the railroad tracks 22a or actual cattle guard 22b more comfortable. An output of the algorithm may also warn the driver to prevent the vehicle 12 from being damaged as it drives over the railroad tracks 22a or actual cattle guard 22b.

Moreover, with knowledge of existing weather conditions (e.g., snow, ice, sleet, heavy rain, or the like) and an accurate perception of a railroad track 22a and the trajectory of an autonomous vehicle, a system 10 in accordance with the present invention may enable the vehicle 12 to anticipate tire slippage and modify its trajectory to prevent a loss of control of the vehicle 12.

For example, a perception module 34 (e.g., a perception module 34 employing sensor fusion) may accurately describe a line representing the railroad tracks 22a as they cross a road 20. When the road 20 has a natural curvature of its own, a vehicle 12 with a heading angle matching the road curvature may slip off the road 20, crash into the shoulder of the road 20, or otherwise experience a recoverable or non-recoverable loss of control.

To prevent this, a system 10 may use the line representing the railroad track and the heading of the vehicle 12 to calculate the angle 24 between the two. The system 12 may then institute a steering response that pushes the angle 24 between the two toward ninety degrees, or as close to ninety degrees as possible given lane constraints or the like. Striving for a perpendicular angle of incidence with respect to the railroad tracks may minimize slippage of the wheels of the vehicle 12 and help maintain control.

In certain embodiments, a system 10 may attempt not only to set the heading of the vehicle 12 (i.e., both steering tires and following tires) orthogonal to the railroad tracks 22a, but also to get the inertial heading of the vehicle 12 completely longitudinal (e.g., no lateral, suspension damped and no yaw) prior to the area of potential slippage. Since railroad tracks 22a may freeze prior to other road surfaces, a system 10 may seek to make all corrections prior to driving over the railroad tracks 22a.

Figure 5:
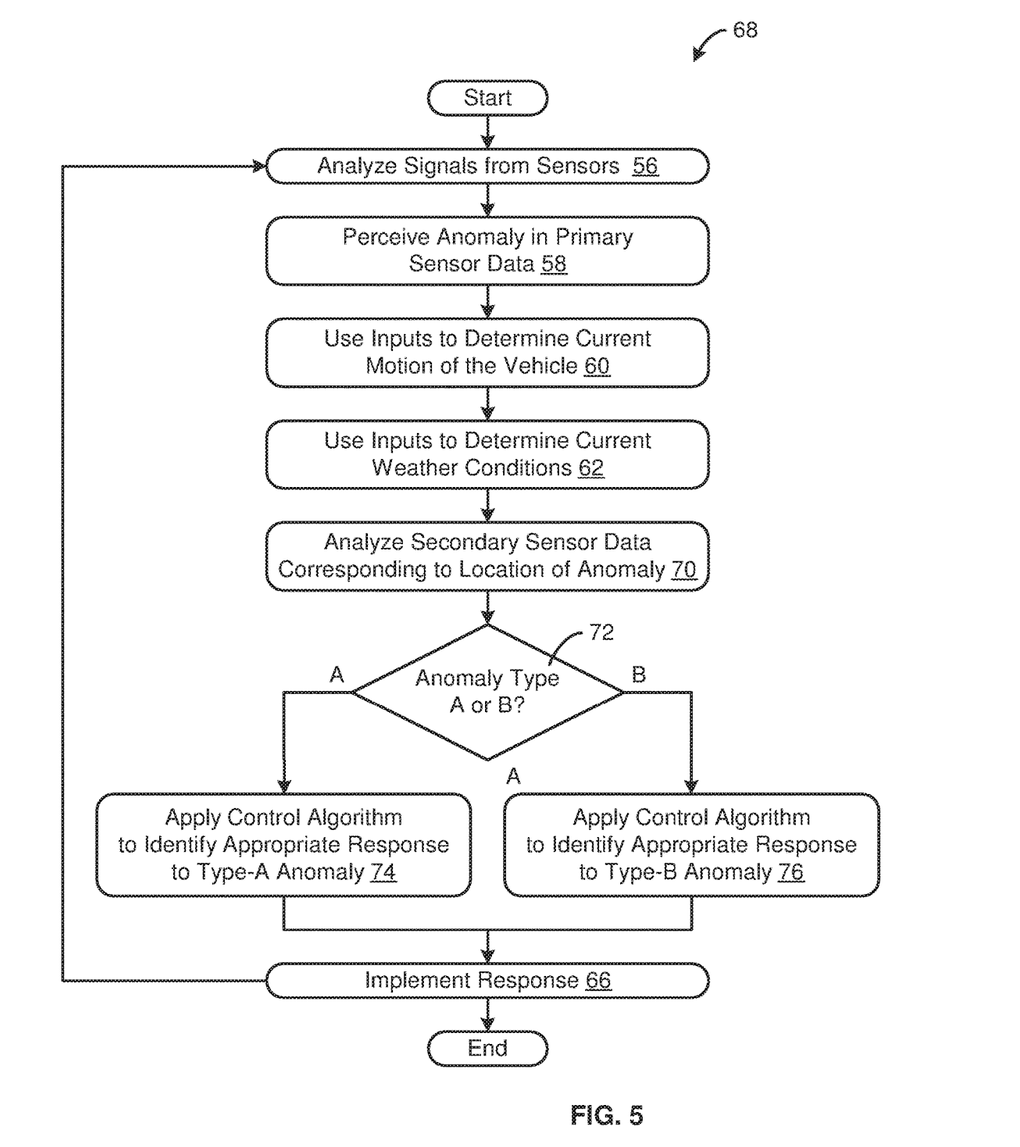
FIG. 5 is a schematic block diagram of an embodiment of a second method that may be executed by a system in accordance with the present invention.

Referring to FIG. 5, a system 10 may support, enable, or execute another process 68 in accordance with the present invention. In selected embodiments, such a process 68 may begin with analyzing 56 data or signals corresponding to one or more sensors 16. Based on that analyzing 56, an anomaly 22 may be perceived 58. In certain embodiments, this perceiving 58 may be based on primary sensor data (i.e., data corresponding to a primary sensor 16 such as a camera 16a). One or more inputs (e.g., data from one or more sensors 16) may be used 60 to determine current motion of a vehicle 12. One or more inputs (e.g., data from one or more sensors 16) may be used 62 to determine current weather conditions in an area surrounding a vehicle 12. This information may be also used to determine how best to prepare to encounter an anomaly 22.

However, in certain embodiments, the data from a primary sensor 16 may not be conclusive. For example, if a primary sensor 16 is a camera 16a, it may be difficult for a system 10 (e.g., a perception module 34) using just camera data to determine whether a cattle guard 22b is a virtual cattle guard 22b or an actual cattle guard 22b. Accordingly, in such embodiments or situations, a system 10 (e.g., a perception module 34) may analyze 70 secondary sensor data corresponding to the location of the anomaly 22. For example, a system 10 may analyze 70 radar data, laser data (e.g., LiDAR data), or the like corresponding to the location of the anomaly 22.

The data corresponding to one or more secondary sensors 16 may provide information or context that cannot be obtained from the data corresponding to the one or more primary sensors 16. Accordingly, the secondary sensor data may enable a system 10 (e.g., a perception module 34) to determine 72 whether the particular anomaly 22 in question is of one type or another (e.g., whether the cattle guard 22b is a virtual cattle guard 22b or an actual cattle guard 22b).

Once sufficient data regarding an anomaly 22, the current motion of the vehicle 12, and/or the ambient weather conditions has been gathered, a system 10 may apply 74, 76 a control algorithm to that data to identify an appropriate response to the anomaly 22. In selected embodiments, a control algorithm may take into account the type of anomalies 22. Accordingly, a control algorithm may recommend one response (e.g., a collection of one or more actions) for a first type of anomaly 22 and another response (e.g., a different collection of one or more actions) for a second type of anomaly 22.

For example, a control algorithm may recommend that no action be taken when it is determined that the cattle guard 22b that was perceived 58 is a virtual cattle guard 22b and that certain suspension changes be timely made when it is determined that the cattle guard 22b that was perceived 58 is an actual cattle guard 22b. A system 10 may then implement 66 the appropriate response.

For example, an autonomous vehicle 12 may possess one or more radar, camera, and/or LiDAR devices to accurately perceive a driving environment 18. However, if the vehicle 12 is primarily using camera output to detect a cattle guard 22b, and hence determine the trajectory of the vehicle 12, a false alarm might be triggered by a virtual cattle guard 22b. To prevent this, forward facing LiDAR and/or radar data may be utilized.

The metal used in an actual cattle guard 22b may give or produce a LiDAR point cloud data with reflectivity values very different from that of a virtual cattle guard 22b with its painted lines. Similarly, radar rays may experience multiple reflections from the metal of an actual cattle guard 22b and hence produce returns comprising a large number of detections on that portion of the road 20. Accordingly, a system 10 in accordance with the present invention may use the detections from LiDAR and/or radar devices to confirm the existence of an actual cattle guard 22b and prevent maneuvers that the vehicle 12 need not take when the cattle guard 22b is merely virtual.

Figure 6:
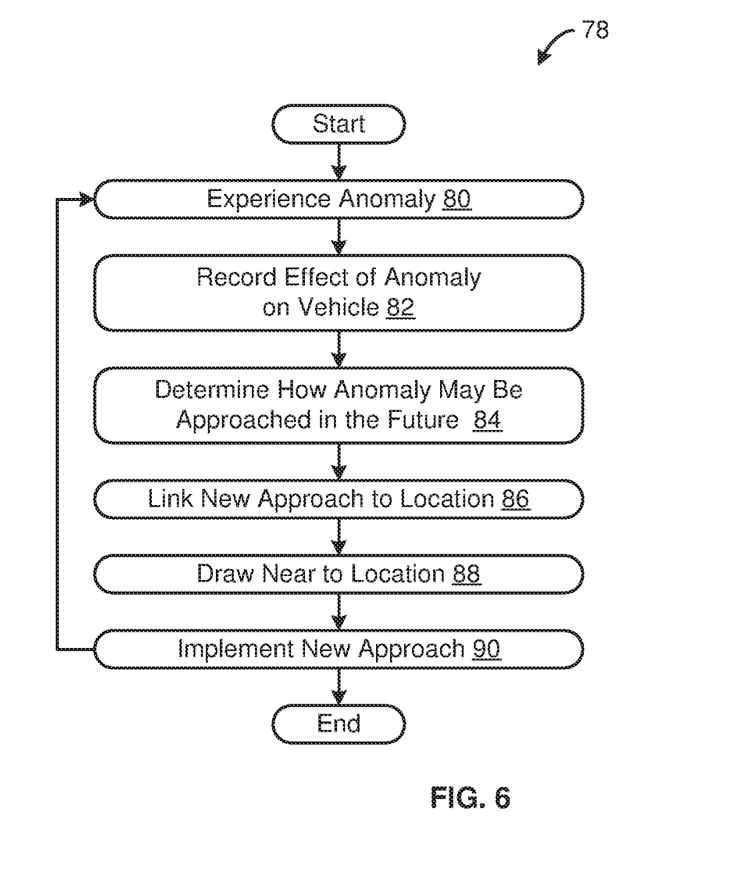
FIG. 6 is a schematic block diagram of an embodiment of a third method that may be executed by a system in accordance with the present invention.

Referring to FIG. 6, a system 10 may support, enable, or execute another process 78 in accordance with the present invention. In selected embodiments, such a process 78 may begin with experiencing 80 an anomaly 22. For example, a vehicle 12 may experience a railroad track 22a or cattle guard 22b by driving over it. The system 10 may then record 82 one or more effects of the anomaly 22 on the vehicle 12. Those effects may be reflected in data corresponding to one or more sensors 16 that is collected as the vehicle experiences the anomaly 22. The effects may include certain vibrations, accelerations, wheel slippage, or the like or a combination or sub-combination thereof.

Analyzing the effects of an anomaly 22, a system 10 may determine 84 how the anomaly 22 may be approached in the future. For example, the system 10 may determine 84 that the anomaly 22 produces little vibration and/or wheel slippage and that it can be traversed at greater speed in the future. Conversely, the system 10 may determine 84 that the anomaly 22 produced significant vibration that that it should be traversed at an even slower speed and/or with a different suspension setup in the future.

In selected embodiments, the new approach (e.g., a better response to the anomaly 22) determined 84 by the system 10 may be stored and linked 86 in some manner to a location in a driving environment 18. Accordingly, when the vehicle 12 draws 88 near that location sometime in the future, the new approach to the anomaly 22 may be triggered or otherwise implemented 90. In this manner, a system 10 may be ever learning and improving its response to anomalies 22.

Figure 7:
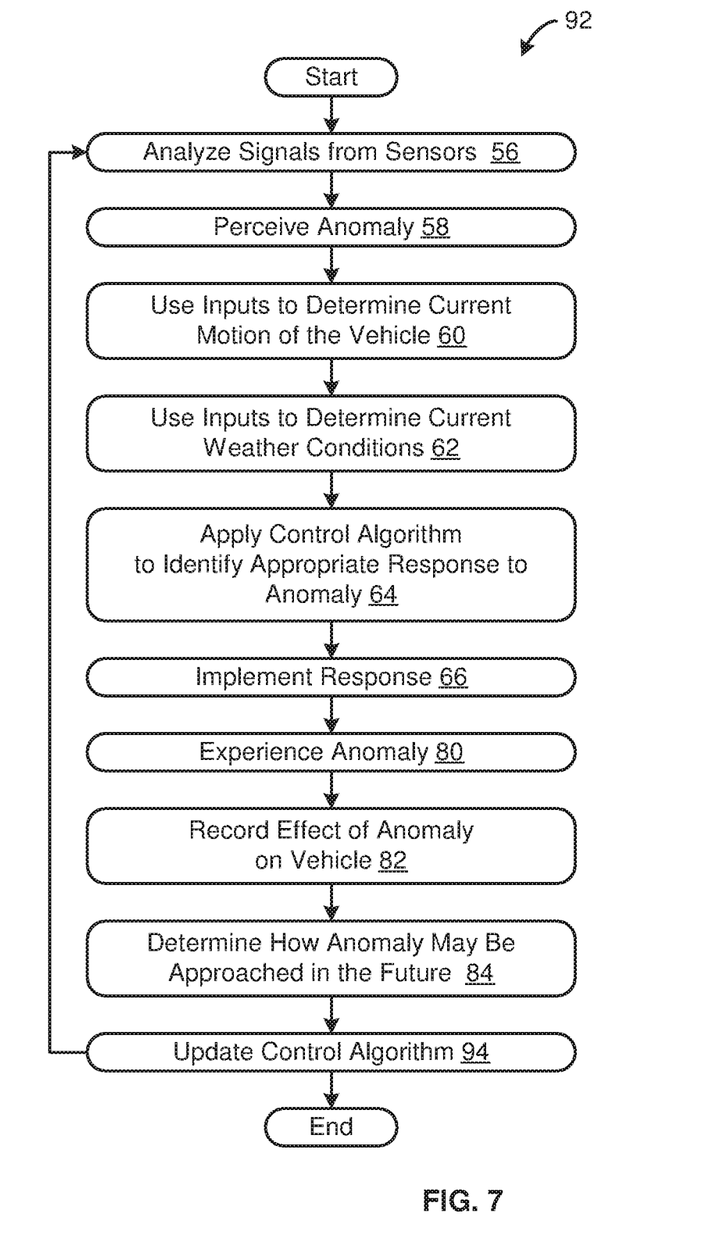
FIG. 7 is a schematic block diagram of an embodiment of a fourth method that may be executed by a system in accordance with the present invention.

Referring to FIG. 7, a system 10 may support, enable, or execute another process 92 in accordance with the present invention. In selected embodiments, such a process 92 may begin with analyzing 56 data or signals corresponding to one or more sensors 16. Based on that analyzing 56, an anomaly 22 such as a railroad track 22a, cattle guard 22b, or the like may be perceived 58. One or more inputs may be used 60 to determine current motion of a vehicle 12. One or more inputs may be used 62 to determine current weather conditions in an area surrounding a vehicle 12. This information or a subset thereof may be used to determine how best to prepare to encounter an anomaly 22.

Once sufficient data regarding an anomaly 22, the current motion of the vehicle 12, and/or the ambient weather conditions has been gathered, a system 10 may apply 64 a control algorithm to that data to identify an appropriate response to the anomaly 22. A system 10 may then implement 66 the appropriate response.

The process 92 may continue with experiencing 80 the anomaly 22. For example, the vehicle 12 may drive over a railroad track 22a, cattle guard 22b, or other anomaly 22. The system 10 may then record 82 one or more effects of the anomaly 22 on the vehicle 12. By analyzing the effects of an anomaly 22, a system 10 may determine 84 how the anomaly 22 may be better approached in the future. Accordingly, the system 10 may update 94 one or more control algorithms to reflect or incorporate one or more aspects of the better approach. In this manner, a system 10 may be ever learning and improving its response to anomalies 22 (e.g., anomalies 22 that have been experienced by a vehicle 12 and anomalies 22 that have not yet been experienced by a vehicle 12).

The flowcharts in FIGS. 4-7 illustrate the architecture, functionality, and operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method comprising:
receiving, by a computer system of a vehicle, one or more inputs corresponding to one or more sensors, at least one of the one or more sensors comprises a forward-looking sensor characterizing a driving environment ahead of the vehicle;
estimating, by the computer system based on the one or more inputs, a motion of the vehicle with respect to an anomaly extending across a road ahead of the vehicle, the estimating including determining an angle of intersection between the anomaly and the road; and
changing, by the computer system, a suspension setting of the vehicle to more safely or comfortably drive over the anomaly.

2. The method of claim 1, wherein the changing comprises controlling, by the computer system, steering of the vehicle to move an angle of arrival of the vehicle with respect to the anomaly closer to ninety degrees.

3. The method of claim 1, wherein the forward looking sensor is selected from the group consisting of an ultrasonic transducer, a laser scanner, a LiDAR (light detection and ranging) device, a radar device, and a camera.

4. The method of claim 1, wherein:
a first sensor of the one or more sensors is a camera; and
a second sensor of the one or more sensors is a radar or LiDAR (light detection and ranging) device.

5. The method of claim 4, wherein the estimating comprises:
using, by the computer system, data corresponding to the first sensor to determine that the anomaly is the cattle guard; and
using, by the computer system, data corresponding to the second sensor to determine that the cattle guard is an actual cattle guard and not a virtual cattle guard.

6. The method of claim 1, wherein at least one of the one or more sensors comprises a device providing data to the computer system via a CAN (controller area network) bus of the vehicle.

7. The method of claim 6, wherein the data provided by the device characterizes the attitude of the vehicle in at least one of pitch, roll, and yaw.

8. The method of claim 1, wherein the anomaly is a railroad track and the estimating comprises determining an angle of intersection between the railroad track and the road.

9. The method of claim 1, wherein the anomaly is a cattle guard and the estimating comprises determining an angle of intersection between the cattle guard and the road.

10. A method comprising:
receiving, by a computer system carried on-board a vehicle, one or more inputs corresponding to one or more sensors carried on-board the vehicle;
receiving, by the on-board computer system, data characterizing at least one of the speed, pitch, roll, and yaw of the vehicle;

estimating, by the on-board computer system based on the one or more inputs and the data, motion of the vehicle with respect to an anomaly by determining an angle of intersection between the anomaly and the road; and changing, by the computer system, a suspension setting of the vehicle to more safely or comfortably drive over the anomaly.

11. The method of claim 10, wherein the anomaly is a railroad track and the estimating comprises determining an angle of intersection between the railroad track and the road.

12. The method of claim 10, wherein the anomaly is the cattle guard and the estimating comprises determining an angle of intersection between the cattle guard and the road.

13. The method of claim 10, wherein receiving, by the on-board computer system, data characterizing at least one of the speed, pitch, roll, and yaw of the vehicle comprises receiving the data from a CAN (controller area network) bus of the vehicle, the data.

14. The method of claim 10, wherein the changing comprises controlling, by the computer system, steering of the vehicle to move an angle of incidence of the vehicle with respect to the railroad track closer to ninety degrees.

15. The method of claim 10, wherein at least one of the one or more sensors comprises a forward-looking sensor characterizing the road ahead of the vehicle.

16. The method of claim 10, wherein the forward looking sensor is selected from the group consisting of an ultrasonic transducer, a laser scanner, a LiDAR (light detection and ranging) device, a radar device, and a camera.

17. The method of claim 10, wherein:
a first sensor of the one or more sensors is a camera; and
a second sensor of the one or more sensors is a radar or LiDAR (light detection and ranging) device.

18. The method of claim 17, wherein the estimating comprises:
using, by the computer system, data corresponding to the first sensor to determine that the anomaly is the cattle guard; and
using, by the computer system, data corresponding to the second sensor to determine that the cattle guard is an actual cattle guard and not a virtual cattle guard.

19. The method of claim 10, further comprising recording, by the computer system, an effect on the vehicle produced by driving over the anomaly.

20. The method of claim 19, further comprising:
determining, by the computer system based on the effect, a better approach for preparing the vehicle to driver over the anomaly;
linking, by the computer system in memory thereof, the better approach to a location corresponding to the anomaly;
approaching the anomaly a second time; and
retrieving and implementing, by the computer system, the better approach at the vehicle approaches and drives over the anomaly the second time.

* * * * *